United States Patent Office 2,736,693
Patented Feb. 28, 1956

2,736,693

METHOD OF PRODUCING HYDRAZINE

Harry E. Gunning, Chicago, Ill., and Allan Kahn, Bellaire, Tex., assignors, by mesne assignments, to Illinois Institute of Technology, Chicago, Ill., a corporation of Illinois No Drawing. Application January 10, 1952,
Serial No. 265,916

4 Claims. (Cl. 204—157)

The present invention relates to an improved method for producing hydrazine.

Hydrazine is a chemical which has been found recently to possess a great number of valuable industrial uses. Hydrazine is one of the principal constituents in rocket fuel. Also, it has unusual properties as a reducing agent, for example, in the reduction of silver salt solutions in spraying processes. In organic chemistry, hydrazine is now being used extensively in the development of new drugs and various bio-chemicals and dyes.

The processes for producing hydrazine heretofore available to the art, however, leave much to be desired.

It is, therefore, an object of the present invention to provide an improved method for producing hydrazine.

It is a further object of the instant invention to provide a method for producing anhydrous hydrazine from an anhydrous reaction medium.

It is an additional object of the instant invention to provide a process for producing hydrazine by a vapor phase process suitable for continuous operation.

It is still another object of the instant invention to provide a method of producing hydrazine by the use of inexpensive starting materials.

It is still a further important object of the instant invention to provide a process for producing hydrazine at high yield.

Other objects, features and advantages of the present invention will be readily apparent from the following detailed description of a preferred embodiment thereof.

It has been suggested that hydrazine may be produced by the photolysis of ammonia. Presumably, the over-all reaction takes place as is represented in Equation 1 below:

(1)     $2NH_3 + h\nu \rightarrow H_2N—NH_2 + H_2$ wherein $h\nu$ represents activating light as a reactive participant. However, the prior workers in the art have been unable to obtain hydrazine in more than trace quantities by carrying out the foregoing reaction.

The instant invention is based on the discovery that certain reactions other than the reaction of Equation 1 take place in competition with the reaction of Equation 1 during the photolysis of ammonia. Such additional reactions or side reactions tend to destroy the hydrazine as soon as it is formed, (in accordance with the reaction of Equation 1) In other words, it is not true that the reaction of Equation 1 actually takes place to so little an extent that it is wholly insignificant, as prior workers in the art have indicated. Instead, the instant invention is based upon the discovery that the reaction of Equation 1 does take place to a substantial extent, but that other competing reactions also take place under the conditions heretofore employed by the workers in the art.

The prior workers in the art subjected ammonia to photolytic conditions by exposure thereof to activating light having a broad wave length range, under substantially static or slow flow conditions. The net result was the production of some nitrogen ($N_2$) and some hydrogen ($H_2$), but only traces of hydrazine.

The instant invention is a process for producing hydrazine by photolyzing ammonia to yield hydrazine and hydrogen that comprises simultaneously subjecting a fast flowing stream of ammonia to activatingly absorbable light and reducing collisions between the hydrogen and hydrazine products so obtained.

It has been found that the photolysis of ammonia involves several different and competing reactions, which it is believed may be represented as follows:

(2)     $NH_3 + h\nu \rightarrow NH_2 + H$
(3)     $2NH_2 \rightarrow H_2N—NH_2$
(4)     $2H \rightarrow H_2$

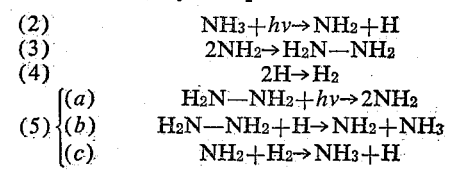

Reactions 5a and 5b involve hydrazine destruction and Reaction 5c is properly grouped therewith because it effects removal of $NH_2$ free radicals which are the particular products of Reactions 5a and 5b, whose presence tends to increase hydrazine formation, according to Equation 3. The overall reaction outlined in Equation 5 is characterized by a tendency to diminish the amount of hydrazine present in a system having the three reactive participants, hydrazine, hydrogen and light. Also, Reactions 5b and 5c comprise a reaction chain indicating that the explanation for the results obtained under static conditions may be that such reaction chain is interrupted only by wall-contact decomposition of free amino radicals to yield $N_2$ and $H_2$.

It is apparent that the Reactions 2, 3 and 5 must take place successively. The reaction of Equation 2 furnishes the reactive participant for the reaction of Equation 3, and the reaction of Equation 3 furnishes one of the reactive participants for the reactions of Equation 5.

In a static and slow flow system it is not important whether or not certain reactions take place successively or simultaneously. The principal problem in such a system is the rate at which each of the reactions takes place. In the photolysis of ammonia, it appears that the reactions of Equation 5 take place at substantially the same rate as that of the reaction of Equation 3, since no appreciable hydrazine yield is obtained in the static system.

In the instant process, the fact that the reactions of Equations 2, 3 and 5 take place successively is exploited by the use of a fast flowing stream of ammonia. A fast flowing stream of ammonia prevents the establishment of true equilibrium conditions. Fast flow or turbulent flow is thereby distinguished from static or substantially static (viscous or streamline) flow. The latter type of flow ordinarily leads to the establishment of a true equilibrium, whereas the former type of flow may be used to advantage in separating the zones wherein each of several successively occurring reactions may predominate or take place most effectively.

Thus, in the photolysis of a fast flowing stream of ammonia, several successive reaction zones are established. The reaction of Equation 2, of course, take place continuously throughout the entire irradiation zone (i. e., the zone in which the stream of ammonia is exposed to the activating light source). However, in the initial upstream portion of the irradiation zone, there is a reaction zone (A) wherein the reaction of Equation 2 predominates. In a reaction zone (B) immediately following the reaction zone (A), the reaction of Equation 3 predominatets. A third reaction zone (C) directly following or downstream of reaction zone (B) has as its predominating reactions the reactions of Equation 5. Apparently the reaction of Equation 4 is comparatively slower than the other reactions and it takes place to some extent in both reaction zone (B) and reaction zone (C). The irradiation zone must, of course, include reaction zones (A), (B) and (C) with sufficient distinctness that interference with the reactions of Equation 5 in reaction zone (C) can be accomplished effectively without undue interference with the other reactions.

One of the requirements for the activating light which may be used in the instant process is that such light must be capable of absorption by ammonia. Ammonia absorbs light of wave lengths ranging from 2400 A. to well into the vacuum ultra-violet light region. For the purpose of the instant invention the operative wave length is from about 2400 A. to about 1700 A., which is the lower limit of light transmission of quartz. Maximum absorption by ammonia occurs within the wave length range of about 1800–1900 A., and the use of such range is therefore preferred in the instant process. The optimum light wave length is 1849 A., at which optimum absorption by ammonia is understood to take place. By the use of light having the preferred and optimum wave lengths, it is possible to accelerate each of the foregoing reactions involving activating light, as well as to exaggerate or emphasize the predominance of each of such reactions in a given reaction zone.

By "saturation intensity" is meant light of at least sufficient intensity to saturate an appreciable portion of the stream of ammonia exposed thereto, so photolysis takes place to an appreciable extent. It is apparent that a low intensity light source might well have little or no effect upon a very large stream of ammonia. Although sufficient intensity of light source is necessary for suitable operation of the instant process, the selection of a light source of sufficient intensity is a matter of simple experiment. The amount of light energy of a given wave length which is absorbed per unit of time is, of course, dependent on the incident light intensity (i. e., of the light source), on the pressure of the ammonia in the light-absorbing zone, and on the length of the absorbing path. It has been found that, in order to absorb a maximum proportion of the incident light, it is necessary to employ conditions such that the ammonia pressure (in mm. of Hg) times the length of the absorbing path (in cm.) must be at least ten.

In the most preferred process of the invention, a fast flowing stream of ammonia is exposed to light of saturation intensity and wave length 1849 A. so as to permit absorption of a maximum proportion of the incident light. Although various operating conditions, including the particular apparatus used, effect the optimum flow rate of the ammonia to such an extent that the optimum flow rate is esssentially a matter of experiment, it has been found that under certain conditions the flow rate of ammonia in the instant process may be as low as about 100 centimeters per minute (cm./min.). The maximum flow rate is primarily that which may be obtained in practical operation. In general, flow rates ranging from about 300 to about 3000 cm./min. (which is about the maximum vapor speed obtainable) are preferred for use in the invention.

As hereinbefore mentioned, the optimum flow rate is essentially an experimental matter to be ascertained on the basis of the apparatus and the conditions used. The essential purpose of the use of the fast flow rate in combination with activatingly absorbable light is the segregation of the various zones wherein each of the foregoing reactions is understood to predominate, so that interference with the reaction or reactions tending to reduce the hydrazine yield may be suitably accomplished.

Such reactions may involve inhibition of hydrazine formation, but it is believed that the most effective of such reactions involves destruction of hydrazine already formed. Experimental results tend to establish that the reaction is one such as is represented in Equation 5 above, since interference with the reaction can be accomplished by excluding (totally or partially) any one of the three reactive participants, viz., light, hydrogen and hydrazine.

The reaction temperature in the irradiation zone or portion of the ammonia stream exposed to activating light may range from about −20° C. to about 40° C. At temperatures below about −20° C. there is a tendency toward condensation of the ammonia, which would interfere with the vapor phase photolysis reaction. At temperatures above about 40° C. there is a tendency toward thermal decomposition of the hydrazine product particularly upon contact of the hydrazine with the walls of the reaction vessel adjacent the irradiation zone. Preferably, the photolytic reaction is carried out within the temperature range of about 0° C. to about 30° C., and the optimum reaction temperature is about room temperature.

Since the instant reaction is a vapor phase reaction, the teperatures employed are dependent to a substantial extent upon the pressure employed. On the other hand, the pressure employed should not exceed a pressure such that temperatures above 40° C. would be necessary in order to maintain a vapor phase, since excessive thermal decomposition of hydrazine takes place at such temperatures. Also, the upstream pressure of the ammonia entering the irradiation zone should be at least sufficient to impart fast flowing properties to the ammonia stream. In general, the pressure of the ammonia stream entering the irradiation zone may range from about 5 pounds per square inch absolute pressure to about 100 pounds per square inch absolute pressure. Preferably, the upstream pressure ranges from about 1 to about 2 atmospheres (i. e., about 15 to 30 pounds per square inch absolute pressure); and the optimum upstream pressure is about 1 atmosphere.

There is no particular advantage to the use of inert or carrier gases in combination with the ammonia in the stream, with the possible exception that certain non-condensable gases might be employed to reduce the tendency toward condensation of ammonia at higher pressures. In the event that an inert gas is used, however, such gas should not be used in such quantities as to interfere with the light absorption of the ammonia, nor should it be appreciably absorptive of the activating light of a wave length absorbed by ammonia.

Moreover, it is an additional advantage of the instant invention that the process may be carried out under an anhydrous condition, in the absence of water or water vapor in the reaction mixture, so as to produce hydrazine initially in its anhydrous form.

The apparatus used for conducting a stream of ammonia into and through the irradiation zone may be of any suitable size and shape, having the various temperature and pressure control mechanisms therefor which may be desired. The walls of the reaction vessel or the walls surrounding the irradiation zone may be of any suitable non-corrosive material. Preferably, the walls are made of a material which catalyzes the formation of hydrogen molecules from hydrogen atoms, as shown in Equation 3 above.

The light source for the irradiation zone is preferably directly connected to and forming a part of the reaction vessel surrounding the irradiation zone. For example, a quartz window may be used to form a direct connection between the irradiation zone and the light source. The light source is preferably a stable high intensity lamp, which operates at room temperatures and emits a major portion of its energy in the region of maximum absorption by ammonia, i. e., 1800–1900 A. The lamp should convert electrical energy into radiant energy with high efficiency. It has been found that a mercury-in-quartz rare gas discharge tube is particularly useful as a light source for the instant invention. Such a lamp comprises an optical envelope containing mercury vapor and an inert gas at a pressure of about 2–12 mm. of mercury and it operates from a high voltage luminous tube transformer. Such a light source is essentially dichromatic, in that approximately 94% of its total energy is emitted as light of wave length 1849 A. and of wave length 2537 A. Since ammonia is transparent to light of wave length 2537 A., such a light source is for all intents and purposes monochromatic when used in the photolysis of ammonia. Furthermore, the 1849 A. line falls precisely in the region of maximum absorption for ammonia.

The photolysis of ammonia to yield hydrazine may be demonstrated as follows:

A cylindrical glass irradiation zone about 3 cm. in diameter and about 10 cm. in length is connected to a trap and a receiver in series. The irradiation zone contains a mercury-in-quartz rare gas lamp hereinbefore described which supplies light of suitable intensity and of wave length 1849 A. throughout the irradiation zone. The trap consists of a downwardly extending closed test-tube-like chamber having an inlet and an exit near the top. The trap inlet communicates directly with the irradiation zone so as to have about 2–5 cm. of travel therebetween. The trap is equipped with a centrally depending smaller test-tube-shaped cold finger, which forms a seal at the top of the trap and extends about half the distance downwardly therein, so as to form an average travel path of about 10 cm. from the trap inlet to the trap exit. The receiver is a downwardly extending closed test-tube-like chamber having an exit to the air near the top and an inlet communicating with the exit of the trap and extending centrally about half-way down into the receiver (a total distance of about 20 cm. from the trap exit).

A stream of ammonia (at atmospheric pressure and room temperature) flowing at a rate of about 5 liters per minute is passed through the irradiation zone, into the trap and around the cold finger therein and out the exit thereof, and through the receiver into the air. The cold finger is cooled by exposure of the inner walls thereof to Dry Ice-acetone (about $-78°$ C.). Some of the ammonia is condensed as it comes into contact with the cold surface of the cold finger and it drops to the bottom of the trap to form a small pool of liquid ammonia. The receiver also collects a small pool of condensed ammonia carried through the trap. A substantial proportion of the ammonia flows through the entire trap and out of the system without being condensed. However, any hydrazine which is formed is condensed and is dissolved in the pools of liquid ammonia at the bottom of the trap of the receiver (the boiling point of hydrazine being $99°$ C.). After seven hours of continuous operation, the total yield of hydrazine was found to be 19 milligrams or $1.4 \times 10^{-6}$ mols per minute.

The foregoing demonstration proves that hydrazine may be produced in more than trace quantities by passing a fast flowing stream of ammonia through a suitable irradiation zone. Presumably that phenomenon can be explained on the basis of the sequence in which the reactions for producing hydrazine and for destroying hydrazine takes place. In other words, considering a given infinitely small increment of the irradiation zone, it can be assumed that the reactions for producing and for destroying hydrazine are taking place simultaneously at substantially the same rate. However, the amount of hydrazine introduced into the incremental zone is not only that produced therein by the hydrazine producing reaction but also an amount of hydrazine carried over from the previous incremental zone. The fact that some hydrazine must always be carried over from a previous upstream incremental zone is supported, logically, by the fact that production of hydrazine must necessarily take place before destruction thereof and, experimentally, by the presence of hydrazine in the trap and receiver.

Also, it seems clear that the activating light is necessary for the hydrazine destroying reaction (as well as for the hydrazine producing reaction). Otherwise, destruction of the hydrazine will take place after the stream leaves the irradiation zone, at which time the activating effect of light upon the production of hydrazine has ceased.

It is now believed that the hydrazine destroying reaction is a function of the number of hydrogen-hydrazine collisions (per mol of hydrazine) which takes place in the irradiation zone during exposure of the hydrazine and photolysis products to activating light. Accordingly, in the practice of the instant invention, the hydrazine yield may be increased by reducing the number of such collisions that take place during exposure to activating light. One method for accomplishing such a reduction in collisions involved interfering physically with the hydrogen-hydrazine collisions.

Since the number of collisions between molecules or atoms in a vapor phase system is a function of the pressure, in that reduction of the pressure increases the amount of travel for each of the molecules or atoms in between collisions thereof, a pressure reduction or pressure drop across the irradiation zone interferes with the hydrogen-hydrazine collisions. The effect of a pressure drop across the irradiation zone in the process of the invention may be demonstrated by carrying out the following procedure:

Using the same irradition zone-trap-and-receiver system heretofore described, a stream of ammonia (at atmospheric pressure and room temperature) is passed through the irradiation zone, into the trap and around the cold finger therein and out the exit thereof, and over to the receiver. The cold finger and the receiver are both cooled by Dry Ice-acetone (about $-78°$ C.), so that complete condensation of all of the condensable gases present is effected in the trap and receiver system. No ammonia is vented to the air from the receiver.

The instant demonstration relates to the operation of a "closed flow system" wherein all the condensable gases in the stream flowing through the system are condensed and collected in the system. The closed (flow) system thus distinguishes from an open (flow) system such as that shown in the first demonstration hereinbefore described, wherein a substantial proportion of the ammonia in the stream is vented to the air. A basic difference between the closed system and the open system resides in the fact that in the open system ammonia is introduced into the irradiation zone at substantially the same pressure at which it leaves the receiver, since no devices are contained therein for effecting a pressure drop across the system. In contrast, in the closed system employed in the instant demonstration, the ammonia is introduced into the irradiation zone at approximately atmospheric pressure; and in the receiver and trap system the ammonia is condensed to a liquid which has a pressure of approximately zero. Accordingly, a pressure drop of approximately fifteen pounds per square inch is effected across the entire system.

Table I below shows the results obtained in the instant demonstration and more specifically describes the various procedures used by specifying the flow rate of ammonia in liters per minute (column 1), the rate of production of hydrazine in mols per minute $\times 10^6$ (column 2), the rate of production of hydrogen in mols per minute $\times 10^6$ (column 3), the rate of consumption of ammonia in mols per minute $\times 10^6$ (column 4), and the percent conversion of ammonia to hydrazine on the basis of the amount of ammonia consumed (column 5).

*Table I*

| Run | l./min. (Col. 1) | $+N_2H_4$ mols/min. $\times 10^6$ (Col. 2) | $+H_2$ mols/min. $\times 10^6$ (Col. 3) | $-NH_3$ mols/min. $\times 10^6$ (Col. 4) | Percent Yield (Col. 5) |
|---|---|---|---|---|---|
| A | 9.5 | 1.37 | 7.68 | 6.95 | 39 |
| B | 7.1 | 1.98 | 8.32 | 8.19 | 48 |
| C | 4.7 | 2.31 |  | 8.85 | 52 |
| D | 2.8 | 2.72 | 8.63 | 9.38 | 58 |
| E | 0.9 | 3.18 | 11.81 | 12.11 | 52 |
| F | 0.2 | 2.66 |  | 12.69 | 42 |

As can be seen from Table I above, both the rate of production of hydrazine and the percent yield appear to increase as the flow rate of ammonia increases from 0.2 l./min. to 2.8 l./min.; but both appear to decrease as the flow rate is increased beyond 2.8 l./min. The decrease in production rate and yield of hydrazine at the flow rate above 2.8 l./min. is explained by the fact that the apparatus employed possesses an insufficient amount of cold condensing surface to accomplish complete condensation of ammonia without building up a back pressure at the condensing surface at such high flow rates and, accordingly, less pressure drop across the irradiation zone was effected. At a flow rate of 2.8 l./min. the particular apparatus employed was capable of completely condensing the ammonia in the stream as fast as it passed through the irradiation zone and, therefore, to effect the maximum pressure drop across the irradiation zone at a maximum flow rate for the instant apparatus.

In the operation of the process employing the instant apparatus under ideal conditions, the ammonia stream enters the irradiation zone at approximately 1 atmosphere of pressure and the pressure is reduced to approximately zero at the trap and receiver system. If substantially complete condensation is effected at the cold finger in the trap, the pressure drop across the irradiation zone alone is almost 15 pounds per square inch. However, it appears that such condensation cannot ordinarily be carried out to completion so as to reduce the pressure at the surface to zero. Liquid ammonia possesses a partial pressure of appreciable magnitude unless it is cooled to below $-78°$ C.

*Run G.*—If a procedure is carried out that is the same as that described for carrying out run D in the foregoing demonstration except that the receiver is maintained at $-195°$ C. instead of $-78°$ C., the production rate of hydrazine is $4.87 \times 10^{-6}$ mols per minute, the production rate of hydrogen is $8.45 \times 10^{-6}$ mols per minute, and the rate of consumption of ammonia is $12.2 \times 10^{-6}$ mols per minute. The percent of ammonia consumed that is converted to hydrazine is therefore 80%.

*Run H.*—If a procedure is carried out that is the same as that described in the foregoing paragraph except that the cold finger is maintained at $20°$ C. instead of $-70°$ C., the rate of production of hydrazine is $5.96 \times 10^{-6}$, the rate of production of hydrogen is $8.17 \times 10^{-6}$ mols per minute, and the rate of consumption of ammonia is $13.4 \times 10^{-6}$ mols per minute. The percent of the ammonia consumed that is converted to hydrazine is 89%.

One explanation for the superior results obtained in the latter of the two instant runs resides in the fact that liquid ammonia not cooled below $-78°$ C. has a partial pressure and that partial pressure of ammonia condensing on the cold finger may exert a back pressure at that point in the system.

It can thus be seen that by reducing the receiver temperature to $-195°$ C. it is possible to effect substantially complete condensation of the ammonia and substantially complete cooling of the liquid ammonia resulting therefrom to such an extent that the vapor pressure of the liquid ammonia is negligible and there is no back pressure at the condensing surface in the system.

The foregoing runs demonstrate again the significance of increasing the pressure drop across the irradiation zone. However, as a matter of practice, an appreciable improvement in the hydrazine yield in a given system may be obtained by increasing the pressure drop across the irradiation zone as little as an amount equal to about 5 inches of water. The friction effected pressure drop in the instant apparatus is negligible, being in the neighborhood of $10^{-6}$ inches of water, and so even the minimum effective pressure drop is many times greater. The maximum amount of pressure drop which may be used is limited solely by the limitations in the pressure and temperature for carrying out the vapor phase reaction. Preferably, the amount of pressure drop across the irradiation zone is at least that equivalent to about 20 inches of water; and the optimum amount of pressure drop which may be obtained for most practical purposes is approximately 1 atmosphere or 15 pounds per square inch.

The pressure drop across the irradiation zone in a closed system may also be expressed in terms of the temperature drop of the ammonia stream. For example, the maximum temperature drop may range from the maximum permissible reaction temperature in the irradiation zone (which is about $40°$ C.) to the minimum practicable condenser surface temperature (which is about $-195°$ C.). It should be appreciated that the precise temperature of the ammonia stream being condensed by a condenser surface maintained at $-195°$ C. can be obtained only with very great difficulty. However, the condenser surface temperatures herein referred to mean the surface temperatures of condenser surfaces which are not appreciably overloaded, i. e., which are sufficiently large to condense completely the stream of ammonia coming into contact therewith without the necessity of appreciable back pressure on the ammonia stream building up against the condensation surfaces.

The maximum possible temperature drop is thus from $40°$ C. to $-195°$ C. Preferably, the temperature drop employed is from room temperature to at least $-100°$ C.; and the minimum temperature drop which can ordinarily be employed to obtain an adequate pressure drop is from about room temperature to at least about $-35°$ C., which is comparable to a temperature differential of at least about $50°$ C. The maximum condenser surface temperature which may be employed in a closed system is approximately $-35°$ C., in order to be assured of satisfactory condensation, since the boiling point of ammonia is $-33°$ C. Ideally, the condenser surface is sufficiently cold to condense the ammonia and almost simultaneously cool the liquid to at least $-78°$ C.; and condenser surface temperatures of below $-100°$ C. are ordinarily needed for such a purpose.

In an open flow system, substantially the same pressure drop as that hereinbefore specified is required in order to obtain the advantageous increase in yield obtained in the instant process. Such a pressure drop may be obtained by the use of extremely high linear velocities in the ammonia stream and by, for example, expanding substantially the reaction chamber throughout or just back of the irradiation zone.

Another method of reducing the number of hydrogen-hydrazine collisions (per mol of hydrazine) during exposure to activating light involves the removal or exclusion from the system of one of the three reactive participants, viz. hydrogen, hydrazine and light.

As hereinbefore explained, the hydrazine destroying reaction is the last reaction to take place chronologically in the instant process. Accordingly, the exclusion of light from that portion of the system wherein the last reaction would normally be taking place most effectively may be accomplished by reducing the amount of time that the ammonia stream is exposed to the activating light. The reduction in time of light exposure may be accomplished by reducing the length of stream travel in the irradiation zone or by increasing the flow rate of the stream.

*Run I.*—If a procedure is carried out that is the same as that described in the foregoing run D, except that one-third of the irradiating lamp is coated (so as to reduce the length of the irradiation zone to one-third of its original length), the amount of hydrazine produced in mols per minute $\times 10^6$ is 2.08, the amount of hydrogen produced in mols per minute $\times 10^6$ is 5.33, the amount of ammonia consumed in mols per minute $\times 10^6$ is 7.29, and the percent of ammonia consumed that is converted to hydrazine is 66%.

Table II below furnishes a time of exposure comparison for the instant Run I and the foregoing Runs D, E and F. In Table II the following data are specified:

The ammonia stream flow rate in liters per minute (column 1), the rate of production of hydrazine in mols per minute $\times 10^6$ (column 2), the rate of production of hydrogen in mols per minute $\times 10^6$ (column 3), the rate of ammonia consumption in mols per minute $\times 10^6$ (column 4), the per cent of ammonia consumed that is converted to hydrazine (column 5), and the time in seconds that is required for ammonia to travel through the irradiation zone (column 6).

Table II

| Run | l./min. (Col. 1) | $+N_2H_4$ mols/min. $\times 10^6$ (Col. 2) | $+H_2$ mols/min. $\times 10^6$ (Col. 3) | $-NH_3$ mols/min. $\times 10^6$ (Col. 4) | Percent Yield (Col. 5) | Time in Zone (Sec.) (Col. 6) |
|---|---|---|---|---|---|---|
| I | 2.8 | 2.08 | 5.33 | 6.29 | 66 | 0.5 |
| D | 2.8 | 2.72 | 8.63 | 9.38 | 58 | 1.5 |
| E | 0.9 | 3.18 | 11.81 | 12.11 | 52 | 4.3 |
| F | 0.2 | 2.66 |  | 12.69 | 42 | 21.5 |

From Table II it can be seen that as the time of exposure (column 6) is reduced, the percent of ammonia consumed that is converted to hydrazine is increased. At the slower flow rates such as those of Runs E and F, the amount of ammonia consumed in mols per minute is quite high but the yield of hydrazine based on the amount of ammonia consumed is comparatively lower. It can thus be seen that at such flow rates the efficiency of the reaction desired is poorer than at higher flow rates and a substantial proportion of the ammonia is consumed in undesirable side reactions (as evidenced by the hydrogen production). On the other hand, the actual production of hydrazine in mols per minute (column 2) may be higher at the less efficient slower flow rates than at optimum flow rates.

In actual practice, the time of exposure should range from about 5 seconds (which is approximately the maximum amount of exposure time that may be employed to obtain a suitably high percent of yield) to about one-tenth of a second (which is approximately the minimum exposure time that may be employed to obtain a suitably high hydrazine production rate). Preferably, the time of exposure is not more than about two seconds. In order to obtain optimum yield conditions, the exposure time should be less than one-half second.

Each of the foregoing times of exposure is based upon the assumption that the stream of ammonia in the irradiation zone in each case is being exposed to light of saturation intensity (or substantially so). Absorption is understood to take place at an extremely rapid rate and, accordingly, the principal factor in obtaining saturation absorption is the light intensity. Whether or not saturation is being obtained in a given system is a simple matter of experiment, since light sources of varying intensity may be compared against yield. On the other hand, it is not absolutely necessary and it may not be desirable from a commercial point of view to employ light of excessively great intensity, or conditions such that absorption of a maximum amount of the incident light energy cannot take place, in order to avoid the power loss involved in the operation of the lamp. If such is the case, the operating conditions are, of course, adjusted correspondingly.

Referring again to Table II, it should be noted that in Run I, the time of exposure is reduced to one-third of that employed in Run D by a corresponding reduction of the travel path of the stream through the irradiation zone. The reduction in the number of hydrazine-hydrogen collisions is, of course, not a straight line function of the reduction in time of exposure because the hydrogen and hydrazine concentrations are not the same in each incremental zone throughout the irradiation zone. The hydrogen concentration increases steadily during irradiation. However, it can be seen that each time the time of exposure is cut about one-half, the yield increases by about 5%, which constitutes a significant increase in the percent of yield.

Another method of reducing the effect of the hydrazine destroying reaction involves removal of hydrogen from the system. Removal of hydrogen from the system results in a reduction in the number of hydrogen-hydrazine collisions per mol of hydrazine and correspondingly effects an improvement in the rate of production of hydrazine as well as in the percent yield of hydrazine.

Run J.—If a procedure is carried out that is the same as that described for the foregoing run D, except that butene-2 is introduced into the irradiation zone with the ammonia in an amount equal to about 5% of the volume of the ammonia, the rate of production of hydrazine in mols per minute $\times 10^6$ is 3.55, the rate of production of hydrogen in mols per minute $\times 10^6$ is 9.7, the rate of consumption of ammonia in mols per minute $\times 10^6$ is about 11.2, and the percent of ammonia consumed that is converted to hydrazine is about 64%.

Any hydrogen exceptor which is otherwise inert with respect to the ingredients and conditions involved in the reaction may be employed to effect the removal of hydrogen during the instant reaction. It has been found that vaporizable olefinic compounds are preferred for use in the instant invention because of their high speed of reaction with hydrogen. Such compounds contain one or more hydrogen-acceptingly reactive carbon to carbon double bonds. Preferably, such olefinic compounds contain from 2 to 10 carbon atoms. Butene-2 has been found to be particularly suitable for the purposes of the instant invention, since the olefinic double bond therein renders that compound substantially more reactive toward hydrogen than is hydrazine.

The amount of hydrogen acceptor which may be used in the practice of the instant invention is essentially a matter of experiment, since it is simply that amount which functions effectively to accept hydrogen and thereby to increase the yield in the instant process. If the particular hydrogen acceptor employed is absorptive of light within the range of light absorbed by ammonia, the amount of hydrogen acceptor used should not be an amount sufficient to interfere appreciably with the light absorption by the ammonia. In the practice of the instant invention, the amount of vaporous olefinic compound that may be used ranges from the least amount which produces an appreciable effect as a hydrogen acceptor (i. e., about one volume percent of the ammonia) to the maximum amount which may be employed without interfering appreciably with the ammonia light absorption (i. e., about 10–15 volume percent of the ammonia). The optimum amount is about 5 volume percent of the ammonia, particularly in the use of butene-2.

In the practice of the instant invention, the number of hydrogen-hydrazine collisions per mol of hydrazine may also be reduced by removal of hydrazine from the reaction zone. That may be accomplished, for example, by the use of an adsorption medium that is selectively capable of absorbing hydrazine without interfering otherwise with the reaction. Also, in certain situations wherein the ultimate use of the hydrazine involves the reaction thereof with another compound, it is possible to have such a compound present in the reaction or irradiation zone or immediately thereafter so as to selectively withdraw hydrazine from the stream (without reacting with the other ingredients present).

Preferably, hydrazine is removed from the irradiation zone by increasing the linear velocity of the hydrazine molecules. Hydrazine, having a boiling point of about 99° C., is much more easily condensed than any of the other ingredients present in the irradiation zone. Accordingly, in a closed flow system wherein complete condensation of all the condensable gases present is effected, the linear speed of hydrazine is effectively increased. In fact, since hydrazine is the most easily condensed gas present in the system, the linear speed of hydrazine is increased to a correspondingly greater extent than that of the other condensable gases in a closed system. Increasing the flow rate through the irradiation zone without increasing the back pressure also increases the linear speed of the hydrazine.

As has been mentioned hereinbefore, the concentration of hydrogen is constantly increasing during the travel of the stream across the irratiation zone. The longer the time or distance of travel, the greater the hydrogen concentration at the exit and, therefore, the greater the number of hydrogen-hydrazine collisions per mol of hydrazine. Hydrogen production results to a certain extent at least from undesirable side reactions. Moreover, increases in the hydrogen concentration tend to increase the hydrazine destruction. The percent yield or percent of ammonia consumed that is converted to hydrazine is almost a straight line function of the molar ratio of the hydrazine-to-hydrogen production rates.

Table III below sets forth for various runs herein described the hydrazine production rate in mols per minute$\times 10^6$ (column 2), the percent of ammonia that is converted to hydrazine (column 3) and the molar ratio of the hydrazine-to-hydrogen production rates (column 4).

Table III

| Run | $+N_2H_4$ mols/min. $\times 10^6$ (Col. 1) | $+H_2$ mols/min. $\times 10^6$ (Col. 2) | Percent Yield (Col. 3) | $N_2H_4/H_2$ Molar Ratio (Col. 4) |
|---|---|---|---|---|
| H | 5.96 | 8.17 | 89 | 0.73 |
| G | 4.87 | 8.45 | 80 | 0.575 |
| I | 2.08 | 5.33 | 66 | 0.39 |
| J | 3.55 | 9.70 | 64 | 0.366 |
| D | 2.72 | 8.63 | 58 | 0.315 |
| E | 3.18 | 11.81 | 52 | 0.269 |
| B | 1.98 | 8.32 | 48 | 0.238 |
| A | 1.37 | 7.68 | 39 | 0.179 |

The $N_2H_4/H_2$ molar ratio is, of course, a function of the number of hydrazine-hydrogen collisions per mol of hydrazine, the lower the $N_2H_4/H_2$ molar ratio the greater the molar proportion of hydrogen to hydrazine and, therefore, the greater the number of collisions per mol of hydrazine. It can be seen from Table III that a 50% reduction in the mols of hydrogen (which doubles the $N_2H_4/H_2$ molar ratio) results in a 50% increase in the yield over that obtained originally. It can also be seen that it is necessary to maintain at least a 1:4 hydrazine: hydrogen molar ratio in order to obtain a satisfactory yield (i. e., about 50%). Preferably, the hydrazine: hydrogen molar ratio is at least about 1:2. Ideal operating conditions would, of course, involve maintenance of a 1:1 molar ratio, as indicated by Equation 1 hereinbefore disclosed.

It will be understood that modifications and variations may be effected without departing from the scope of the novel concepts of the present invention.

We claim as our invention:

1. A process for producing hydrazine by photolyzing ammonia in the vapor phase to yield hydrazine and hydrogen, that comprises subjecting a fast flowing stream of ammonia flowing at a linear rate of at least 100 cm. per second to exposure by light of wave length 1849 A. and, during such exposure, withdrawing hydrogen from the stream in an amount sufficient to improve the hydrazine yield by reaction therewith of a vaporous olefinic compound having two to ten carbon atoms that is present in the stream.

2. A process for producing hydrazine by photolyzing ammonia in the vapor phase to yield hydrazine and hydrogen, that comprises subjecting a fast flowing stream of ammonia flowing at a linear rate of at least 100 cm. per second to activatingly absorbable light in the presence of 1–15 volume percent of the ammonia of a vaporous olefin having from 2 to 10 carbon atoms that is present in the stream.

3. A process for producing hydrazine by photolyzing ammonia in the vapor phase to yield hydrazine and hydrogen, that comprises subjecting a fast flowing stream of 95 volume percent of ammonia and 5 volume percent of butene-2 to exposure by light of saturation intensity and wave length 1849 A. said stream flowing at a linear rate of at least 300 cm. per second.

4. A process for producing hydrazine by photolyzing ammonia in the vapor phase to yield hydrazine and hydrogen, that comprises subjecting a stream of 95 volume percent ammonia and 5 volume percent of butene-2, flowing at a linear rate of at least 300 centimeters per minute, to exposure by light of wavelength 1849 A. and, during such exposure, effecting a one atmosphere pressure drop in the stream.

References Cited in the file of this patent

Ellis et al.: Chemical Action of Ultraviolet Rays (1941), pp. 258, 317–323.

L. F. Audrieth et al.: The Chemistry of Hydrazine, published by John Wiley & Sons, New York, 1951, pp. 22–24.